United States Patent [19]
Gomi et al.

[11] Patent Number: 5,796,012
[45] Date of Patent: Aug. 18, 1998

[54] ERROR CORRECTING CORIOLIS FLOWMETER

[75] Inventors: Shingo Gomi; Hirokazu Kitami; Takashi Endo; Kenichi Matsuoka; Kimihiro Ichinose; Osamu Futagawa; Seiji Kobayashi; Kazuhide Kobayashi, all of Tokyo, Japan

[73] Assignee: Oval Corporation, Tokyo, Japan

[21] Appl. No.: 788,119

[22] Filed: Jan. 23, 1997

[30] Foreign Application Priority Data

Sep. 19, 1996 [JP] Japan .................. 8-247538
Sep. 30, 1996 [JP] Japan .................. 8-258814

[51] Int. Cl.$^6$ ............................. G01F 1/84
[52] U.S. Cl. .............. 73/861.357; 73/861.356
[58] Field of Search .......... 73/861.355, 861.356, 73/861.357

[56] References Cited

U.S. PATENT DOCUMENTS

| | | | |
|---|---|---|---|
| 4,680,974 | 7/1987 | Simonson et al. | 73/861.357 |
| 5,381,697 | 1/1995 | Van Der Pol | 73/861.356 |
| 5,448,921 | 9/1995 | Cage et al. | 73/861.357 |

FOREIGN PATENT DOCUMENTS

| | | |
|---|---|---|
| 261435 | 3/1988 | European Pat. Off. . |
| 598287 | 5/1994 | European Pat. Off. . |
| 9529385 | 11/1995 | WIPO . |

Primary Examiner—Ronald L. Biegel
Assistant Examiner—Harshad Patel
Attorney, Agent, or Firm—Jordan and Hamburg

[57] ABSTRACT

A resonantly drivable straight tube type Coriolis flowmeter which is capable of correcting instrumental errors caused by a change in density and temperature of measurable fluid. A coaxial double tube body that is composed of an inner tube wherein fluid to be measured flows and an outer tube with a balance weight attached thereto for equalizing natural frequencies of the inner and outer tubes is driven at a resonant frequency having a constant amplitude. A change of fluid density causes a change of amplitude ratio of the inner tube and the outer tube, resulting in shifting of an instrumental error. At this time, a resonant frequency detecting circuit detects a resonant frequency without detecting the amplitude ratio. An instrumental error detecting circuit stores a relation between resonant frequencies and fluid densities and a relation between fluid densities and instrument errors and conducts correction of an instrumental error according to the detected resonant frequency. An instrumental error caused by thermal deformation of the inner tube and the outer tube which are different from each other in material and shape can be also corrected by using similar correcting means.

6 Claims, 5 Drawing Sheets

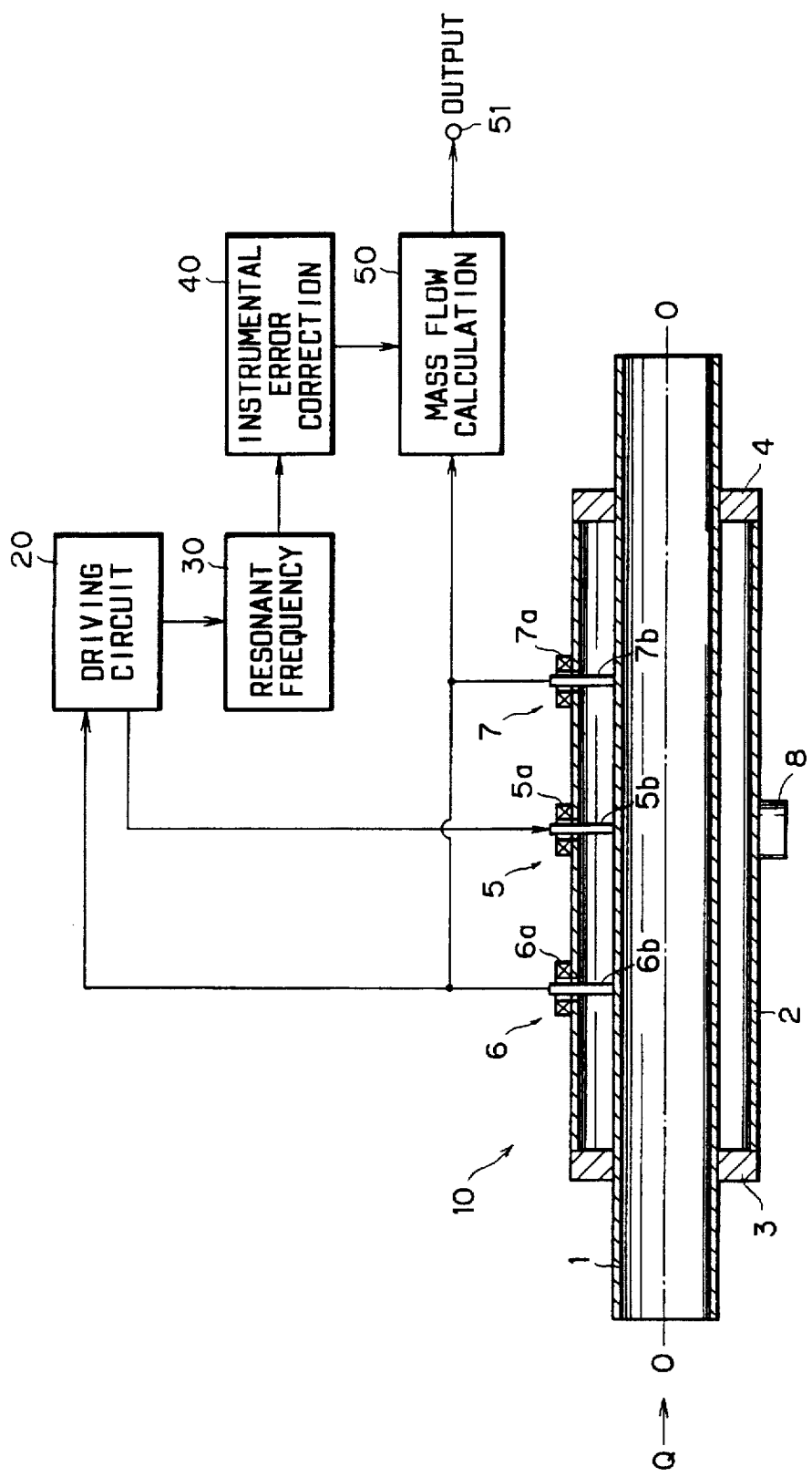

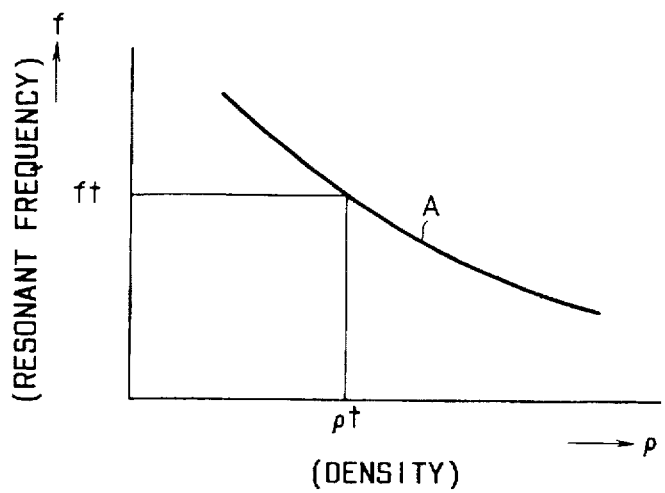
FIG.2(A)
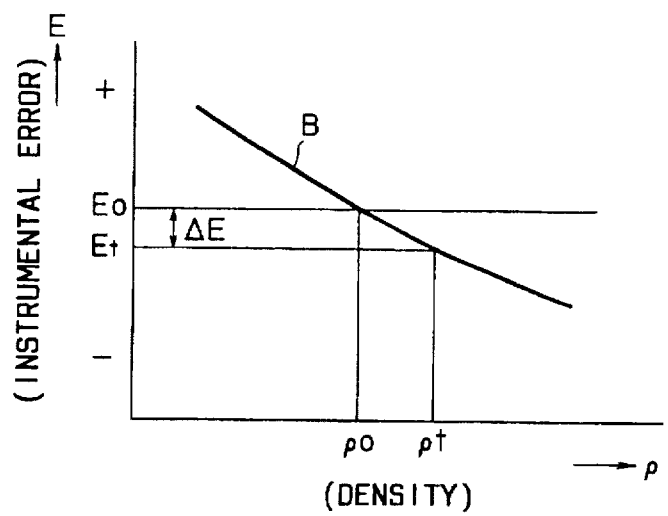
FIG.2(B)
FIG.3
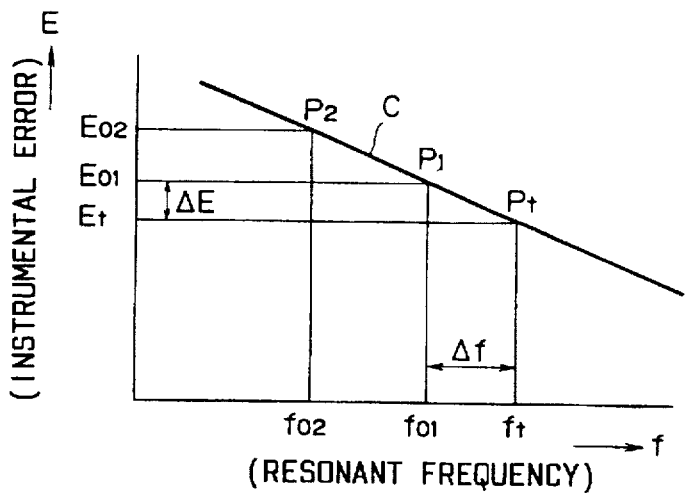

ERROR CORRECTING CORIOLIS FLOWMETER

BACKGROUND OF THE INVENTION

The present invention relates to a Coriolis flowmeter and more particularly to a Coriolis flowmeter which has a body comprising a straight flow tube for allowing fluid to flow therein and resonant member secured at both end to the flow tube so being coaxial with or in parallel to the flow tube and has a correcting means for correcting an instrumental error caused by a difference of density of fluid, a difference of temperature deformation of material of the flow tube and a difference of temperatures of the flow tube and resonant member, outputting a precise mass flow signal corrected for an instrumental error.

As well known, a Coriolis flowmeter is a mass flowmeter that measures mass flow rate of fluid flowing in a flow tube supported at both ends by oscillating a flow tube and detecting a Coriolis force acting on a flow tube, which is proportional to the mass flow rate of the fluid. The Coriolis force is detected as a difference of phases produced at symmetrical positions between the supporting points and center portion of the flow tube when the flow tube is driven alternately at its center portion in a direction perpendicular to the supporting axis.

The above-mentioned flowmeter may be formed in small size for easy maintenance if its measuring conduit is a singular straight flow tube. However, a large energy may be required to drive the straight flow tube at a specified amplitude and a displacement value necessary for determining a phase difference is small. Consequently, the single-straight conduit type flowmeter may be easily affected by any external vibration and may have a decreased signal-to-noise ratio.

To solve the above-mentioned problems, the present applicant previously proposed such a Coriolis flowmeter that has a coaxially double-walled conduit composed of an inner tube (flow tube) in which a fluid to be measured flows and an outer tube (resonant member) secured at both ends onto the outside of the inner tube and having an attached thereto balance weight for equalizing a natural frequency of the outer tube to a natural frequency of the inner tube and drives the inner tube and the outer tube anti-phasely at a resonant frequency having a constant amplitude.

The above-mentioned Coriolis flowmeter whose inner tube can vibrate at a large amplitude, being driven by a small energy and which can, therefore, detect a displacement at a high sensitivity. It is a straight conduit type flowmeter that is small and easy to maintain. This flowmeter, however, involves such a problem that a change in density of a fluid to be measured causes a change in frequency amplitude ratio of the inner tube and the outer tube and results in an instrumental error varying as an inverse function of the fluid density when an exciting frequency of the inner tube and the outer tube is controlled to always have a constant amplitude of a driving frequency. Consequently, the flowmeter was still required to have a higher accuracy of measuring a mass flow-rate of fluid having a wide range of its density.

Furthermore, the flowmeter which has the flow tube and the resonant member which is disposed coaxially or parallel to the flow tube, being supported at both ends thereon, and adjusted to have a natural frequency equal to a natural frequency of the flow tube, may have a frequency difference between the flow tube and the resonant member in consequence of change of the resonant frequency by the influence of an external temperature, fluid temperature and a differential temperature between the flow tube and the resonant member. This frequency difference causes an error in case of correcting an instrumental error or determining a density of fluid to be measure in the resonantly driven conduit type Coriolis flowmeter.

The above-mentioned Coriolis flowmeter is small and easy to use and maintain since its inner tube is coaxially connectable at both ends to external pipings, assuring easily cleaning off its inner wall and easily mounting in a small space. However, the flowmeter must work usually with various kinds of fluid having different temperatures and density, which flow in the inner tube of the coaxial double-straight-tube body. This may change the natural frequency of the flowmeter body, causing the phase difference measuring system of the flowmeter to have a changed instrumental error. Accordingly, the coaxial double-straight-tube type Coriolis flowmeter requires correction of an instrument error that may be caused due to physical property of fluid to be measured therein.

SUMMARY OF THE INVENTION

In view of the foregoing, it is an object of the present invention to provide a double resonant straight conduit or parallel resonant straight conduit type Coriolis flowmeter which includes means for automatically correcting an instrumental error (displacement) resulted from a change in density of a fluid to be measured according to a predetermined relation between the fluid density and the conduit resonant frequency and a predetermined relation between the fluid density and the instrument error, both of which are stored in a storage.

Another object of the present invention is to provide a double resonant straight conduit or parallel resonant straight conduit type Coriolis flowmeter which can store predetermined data on a relation between resonant frequency and the instrumental error for a plurality of fluids having known density in a storage and has means for automatically correcting an instrumental error according to a difference of resonant frequency of the measured fluid from the stored resonant frequency of the fluid having a known density.

Another object of the present invention is to provide a double resonant straight conduit or parallel resonant straight conduit type Coriolis flowmeter which has means for automatically compensating a frequency difference caused by differential thermal change of elastic coefficients and secondary sectional moments of the flow tube and the resonant member which are different from each other in material and shape and, therefore, differently deform due to temperature change. Another object of the present invention is to provide a double resonant straight conduit or parallel resonant straight conduit type Coriolis flowmeter which has means for automatically compensating a frequency difference corresponding to an axial load caused by a thermal expansion of the flow tube wherein fluid of different temperature flows and a thermal expansion of the resonant member disposed near to the flow tube.

It is another object of the present invention to provide a Coriolis flowmeter converter representing a mass flow calculator which can easily determine respective compensative instrumental errors by comparing with reference values measured with a flow of fluid previously corrected and standarized so as to correct a substantial instrumental error plus respective instrumental errors caused under the effect of temperature and density of fluid flowing in the coaxial double-straight-tube type Coriolis flowmeter.

BRIEF DESCRIPTION OF THE DRAWINGS

FIG. 1 is a view for explaining a construction of a Coriolis flowmeter embodying the present invention.

FIG. 2 is a graph for explaining an embodiment of the present invention.

FIG. 3 is a graph for explaining another embodiment of the present invention.

PREFERRED EMBODIMENTS OF THE INVENTION

Figure 4:
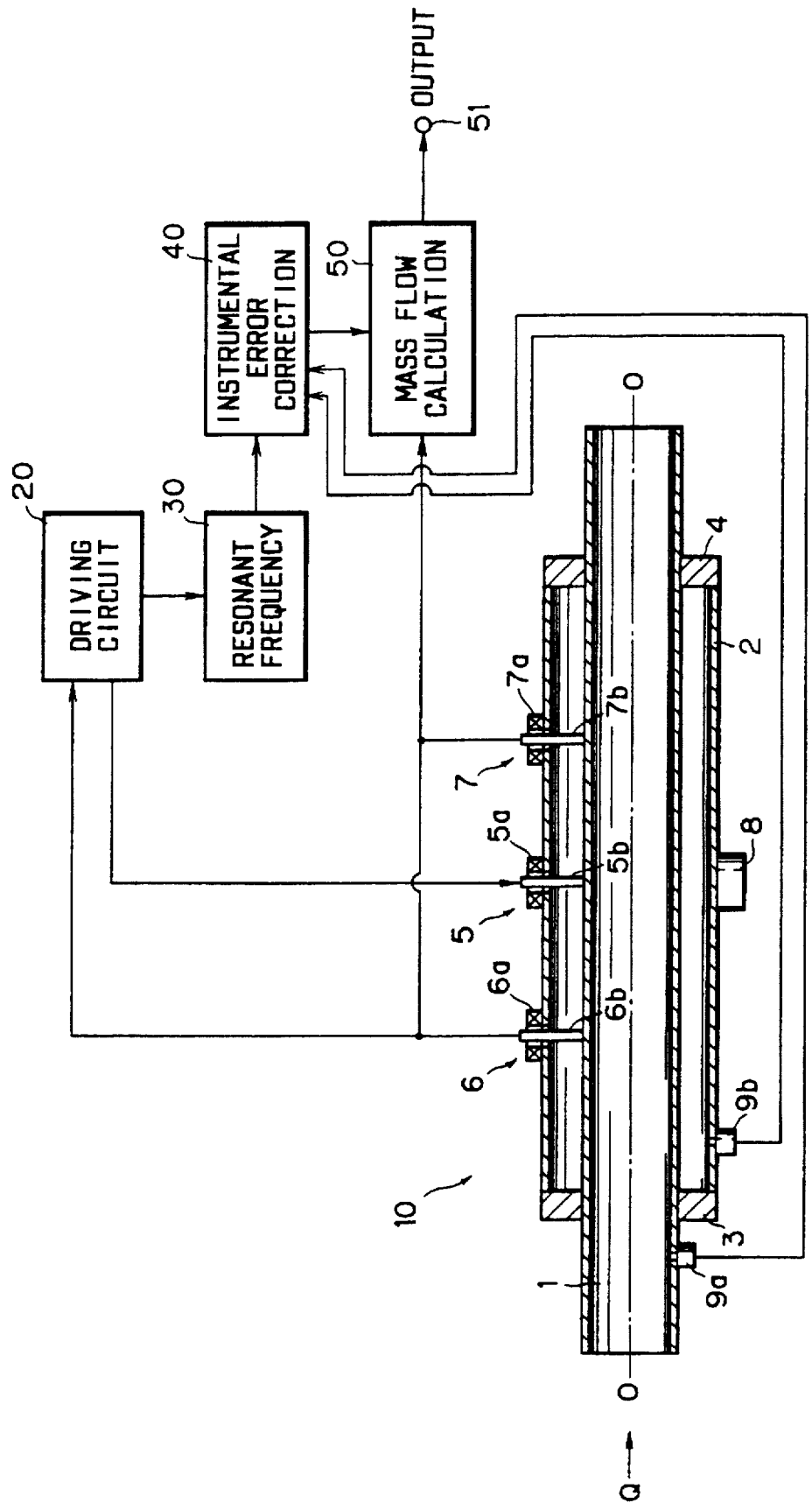
FIG. 4 is a view for explaining a construction of another Coriolis flowmeter embodying the present invention.

A Coriolis flowmeter having a body composed of a coaxial double conduit is taken by way of example as an embodiment of the present invention and its operation will be first described below.

FIG. 1 is illustrative of a configuration of a Coriolis flowmeter embodying the present invention. In FIG. 1, the flowmeter comprises an inner tube 1, an outer tube 2, ring flanges 3, 4, a vibrator 5, sensors 6, 7, a balance weight 8, a double oscillating conduit 10, a driving circuit 20, a resonant frequency detecting circuit 30, an instrumental error correcting circuit 40, a mass flow-rate calculating circuit 50 and an output terminal 51.

The double oscillating conduit 10 is composed of the inner tube 1, the outer tube 2 and the balance weight 8. The inner tube 1 is a straight conduit whose axis is shown by 0—0 and in which fluid to be measured flows. The outer tube 2 having ring flanges 3 and 4 at both ends, by which it is coaxially mounted on the external cylindrical surface of the inner tube 1. The balance weight 8 is secured to a center portion of the external wall of the outer tube 2. This balance weight 8 is used for making a natural frequency of the outer tube 2 equal to the natural frequency of the inner tube 1.

The weight of the balance weight 8 is adjusted to the natural frequency determined in view of the weight including mass of the vibrator 5 for driving the double-wall conduit and mass of the sensors 6 and 7.

The vibrator 5 is composed of, e.g., a coil 5a attached to the outer tube 2 and core 5b coaxially mounted to the inner tube 1. The coil 5a is excited in a closed loop by the driving circuit 20 whereto a signal from either one of two sensors 6 and 7 (to be described later) is inputted. The inner tube 1 and the outer tube 2 are driven anti-phasely relative to each other at a resonant frequency of a constant amplitude.

The sensors 6 and 7 have the same standard characteristics and disposed at symmetrically opposite positions relative to the vibrator 5 on the double-wall conduit 10. Each sensor 6, 7 consists of a coil 6a, 7a and a magnet 6b, 7b, which are coaxially mounted on the outer tube 2 and the inner tube 1 respectively. They are used for detecting a relative displacement of the inner tube 1 and the outer tube 2.

The vibrator 5 alternately drives the inner tube 1 into vibration in the direction perpendicular to the axis 0—0 at an alternate resonant frequency having a specified amplitude. Consequently, Coriolis force acts on the inner tube 1 in opposite directions at the positions of the sensors 6 and 7 which in this case generate output signals to produce a phase difference ΔT proportional to the coriolis force. Therefore, this phase difference ΔT is proportional to a mass flow-rate Qm. The phase difference ΔT is also proportional to an amplitude $\delta_I$ of the inner tube 1 for measuring a flow rate of fluid and has the following expression (1):

$$\Delta T = K_1 \delta_I Q_m \quad (1)$$

where $K_1$ is a constant.

The amplitude $\delta_I$ is a function of density of fluid to be measured and expressed by the following equation (2):

$$\delta_I = \frac{K_2}{1 + \sqrt{\frac{K_3 + K_4 \rho}{K_5}}} \quad (2)$$

where $K_2$ to $K_5$ are constant values.

Namely, a change of fluid density is inevitably accompanied by a change of the amplitude $\delta_I$ of the inner tube with a change of an amplitude ratio of the outer tube 2 relative to the inner tube 1 even if the inner tube 1 and the outer tube 2 are driven by the vibrator 5 at the relatively same amplitude. Consequently, the amplitude $\delta_I$ of the inner tube 1 varies as an inverse function of density $\rho$ according to the equation (2).

A total mass applied to the inner tube 1, which is determined by adding together mass values of the vibrator 5, the sensors 6, 7 and the inner tube 1 itself. A mass of fluid having density $\rho$ within the inner tube 1 is further added thereto to obtain a mass $\Delta m_f$ per unit of the inner tube 1. Expressing a natural frequency as f in this case, this unit mass $\Delta m_x$ can be expressed as follows:

$$f = \frac{1}{2\pi} \sqrt{\frac{K_6 \Delta m_f + K_7}{K_8 \Delta m_f \delta_I^2 + K_9 \delta_I^2}} \quad (3)$$

where $K_6$ to $K_9$ are constant values.

$$\Delta m_f = K_{10} + K_{11} \rho \quad (4)$$

where $K_{10}$ and $K_{11}$ are constant values.

The natural frequency f of the inner tube wherein the fluid having the density $\rho$ can be expressed as a function $F(\rho)$ of the density $\rho$ only by erasing the amplitude $\delta_I$ of the inner tube 1 from Equations (2), (3) and (4).

$$f = F(\rho) \quad (5)$$

Therefore, the fluid density ($\rho$) can be determined according to Equation (5) if the frequency f of the vibrator resonantly driven by the driving circuit 20 is detected by the resonant frequency detector 30.

If the relation between the fluid density $\rho$ and the resonant frequency f (i.e., the natural frequency) of the inner tube 1 is known, the fluid density $\rho_f$ can be determined from the measured resonant frequency $f_r$ according to Equation (5). When the fluid density $\rho_f$ is determined, an instrumental error can be corrected by using previously stored data on a relation between density and instrumental error.

The present invention is directed to correction of an instrumental error caused by a change of fluid density by determining a first relation (fluid density-resonant frequency) and a second relation (fluid density-instrumental error), storing the measured data, determining density of fluid by comparing a resonant frequency measured with a fluid flow to the first relational data, determining an instrumental error from the obtained density by comparing the later to the second relational data and compensating the determined instrumental error.

FIGS. 2(A) and 2(B) are views for explaining an embodiment of the present invention. FIG. 2(A) is a graph (curve A)

showing relation between fluid density ρ and resonant frequency f. FIG. 2(B) is a graph (curve B) showing relation between fluid density ρ and instrumental error E.

The curve A of FIG. 2(A) is plotted by taking fluid density ρ as abscissa (horizontal axis) and resonance frequency f as ordinate (vertical axis). This curve relating the function of Equation (5) is previously determined by calculation or experiment and stored as the first relation data in the instrumental error correction circuit 40. The curve B of FIG. 2(B) is plotted by taking fluid density ρ as abscissa and instrumental error as ordinate. This curve is previously determined by calculation according to Equations (2) and (1) or experiments on the condition that fluid having a reference density $\rho_o$, e.g., water at a specified temperature is taken as reference fluid for which an instrumental error $E_o$ is defined as 0 ($E_o=0$). The characteristic data is stored as the second relation data in the instrumental error correction circuit 40. A fluid density $\rho_r$ corresponding to a measured resonance frequency $f_r$ is determined from the curve A of FIG. 2(A), then an instrumental error $E_r$ corresponding to the determined fluid density $\rho_r$ is determined from the curve B of FIG. 2(B). A deviation ΔE of the determined instrument error $E_o$ from the reference value $E_o$ is calculated and corrected.

A relation between an instrumental error and a frequency difference Δf (between a resonance frequency f of a fluid and a reference resonant frequency $f_o$ of reference fluid having the reference density) can be stored and used for correcting an instrumental error. The present invention is also directed to correction of an instrumental error resulted from a change of fluid density by previously determining and storing a relation between instrumental error deviations and resonance frequency differences (from the resonant frequency of the reference fluid) for a plurality of fluids having different density values, determining a frequency difference by comparing a resonant frequency measured with a flow of fluid to the stored data, determining.

FIG. 3 is a view for explaining another embodiment of the present invention. In FIG. 3, the graph (line C) shows a relation between resonant frequency and instrument error E.

The graph of FIG. 3 indicates resonance frequency f on the horizontal axis (x-axis) and instrument error E on the vertical axis (y-axis). The line C is plotted passing two points $P_1$ and $P_2$ which are intersection of perpendiculars from the x-axis and the y-axis respectively, i.e., $P_1$ is fixed by the abscissa of a resonance frequency (reference frequency) $f_{o1}$ with a flow of fluid having a known density (e.g., water of 20° C. and by the ordinate of an instrumental error $E_{o1}$ ($E_{o1}=0$) and $P_2$ is fixed by the abscissa of a resonance frequency $f_{o2}$ with a flow of fluid having a known density (e.g., 0.7 g/cc of oil) and by the ordinate of an instrumental error $E_{o2}$. The data of the line C is stored in the instrumental error correction circuit 40 which determines a frequency difference Δf between resonant frequency $f_r$ (measured with a flow of object fluid) and the reference resonance frequency $f_o$ and find a point $P_r$ at which perpendicular from the abscissa of $f_r$ intersect with the line C and the ordinate $E_r$ corresponding to the point $P_r$, then determines a deviation ΔE of instrumental error from the ordinate $E_r$ and corrects the instrumental error, for example, as (ΔE%/ΔfHz). Although the line C is indicated for clarity as a straight line, it may be represented strictly as a curve.

The above-mentioned features of the present invention relate to correction of instrumental errors caused by a change in density of fluid to be measured. The Coriolis flowmeter, however, may still be influenced by temperature (e.g., temperature-dependent change of sensitivity and frequency) besides above-mentioned effect of fluid density.

In a double-walled straight conduit type Coriolis flowmeter, an inner tube 1 and an outer tube 2 composing a double-walled conduit are usually different from each other in material and sectional shape. When the inner tube 1 and the outer tube 2 are thermally deformed, natural frequencies of respective tubes, which are defined according to materials and shapes, may differently change resulting in changing a coupled frequency, i.e., resonant frequency of the double-walled straight conduit changes being accompanied by an instrumental-error shift. Therefore, it is necessary to compensate an instrumental error due to a temperature change.

The present invention is also directed to correction of an instrumental-error shift caused when an inner tube and an outer tube change their temperatures respectively.

FIG. 4 is illustrative of a configuration of a Coriolis flowmeter embodying the present invention. In FIG. 4, there is shown an inner tube 1, an outer tube 2, ring flanges 3, 4, a vibrator 5, sensors 6, 7, a balance weight 8, temperature sensors 9a, 9b, an oscillating coaxial double-tube body 10, a driving circuit 20, a resonant frequency detecting circuit 30, an instrumental error correcting circuit 40, a mass flow-rate calculating circuit 50, an output terminal 51.

When the inner fluid-flow tube has a sectional secondary moment $I_1$, mass $M_1$ and an elastic modulus $E_1$ and the outer tube 2 has a sectional secondary moment $I_2$, mass $M_2$ and an elastic modulus $E_2$, a natural frequency $f_1$ of the inner tube 1 is expressed by Equation (6) and a natural frequency $f_2$ of the outer tube 2 is expressed by Equation (7).

$$f_1 = \frac{1}{2\pi} \left( \frac{K_{12}E_1 I_1}{K_{13}M_1} \right)^{\frac{1}{2}} \tag{6}$$

where $K_{12}$ and $K_{13}$ are constant values.

A natural frequency $f_2$ of the outer tube 2 is expressed as follows:

$$f_2 = \frac{1}{2\pi} \left( \frac{K_{14}E_2 I_2}{K_{15}M_2} \right)^{\frac{1}{2}} \tag{7}$$

where $K_{14}$ and $K_{15}$ are constant values.

The inner tube 1 having the natural frequency $f_1$ determined by Equation (6) and the outer tube 2 having the natural frequency $f_2$ determined by Equation (7) produce a coupled frequency f, i.e., a resonant frequency f which can be expressed by Equation (3). However, the elastic moduli $E_1$, $E_2$ and the sectional secondary moments $I_1$, $I_2$ changes as their temperatures change. If the elastic moduli $E_1$, $E_2$ and the sectional secondary moments $I_1$, $I_2$ change to $E'_1$, $E'_2$ and $I'_1$, $I'_2$ respectively as the temperature changes from the initial value by a value t, the elastic moduli $E'_1$, $E'_2$ and the sectional secondary moments $I'_1$, $I'_2$ have the following expressions, wherein α and β are temperature coefficients:

$$E_1' = (1+\alpha t)E_1 \tag{8}$$

$$E_2' = (1+\alpha t)E_2 \tag{9}$$

$$I_1' = (1+\beta t)I_1 \tag{10}$$

$$I_2' = (1+\beta t)I_2 \tag{11}$$

When $(E_1 I_1)$ is considered as a reference value and a constant γ is used, the following expressions are obtained.

$$(E_1 I_1)' = (1+\gamma t)E_1 I_1 \tag{12}$$

$$(E_2 I_2)' = (1+\gamma t)E_2 I_2 \tag{13}$$

The natural frequency $f_1'$ of the inner tube 1 and the natural frequency $f_2'$ of the outer tube 2 are calculated according to Equations (6) and (7) by substituting the above-mentioned equations (8) to (11) or Equations (12) to (13) into the corresponding Equations (6) and (7). The reference resonant frequency f' is obtained from Equation (3) and a frequency difference Δf is then calculated. The instrumental error is calculated against the determined frequency Δf and corrected.

The inner tube 1 and the outer tube 2 are coaxially supported and compose a double-wall straight conduit. When fluid flows, the inner tube 1 changes its temperature heated by the fluid, causing a difference of its wall temperature from the wall temperature of the outer tube 2. At the same time, the inner and outer tubes thermally expand and produce different stresses therein in the axial direction. These stresses cause the resonant frequencies of the respective tubes. A compressivestress reduces the resonant frequency of each tube whereas a tensilestress increases the resonant frequency. Accordingly, if the inner tube 1 gets a high temperature, its frequency $f_1'$ becomes smaller and the frequency $f_2'$ of the outer tube is increased. So, the coupled frequency f' is influenced.

The present invention is also directed to correction of a change of resonant frequency due to a load P resulted from thermal stresses produced in an inner tube 1 and an outer tube 2 in their axial directions when the inner tube changes its temperature being heated by fluid flowing therein, causing a difference of temperatures of two tubes.

The inner tube 1 and the outer tube 2 are provided with temperature sensors bonded one to each tube for detecting wall temperature of the respective tubes. The elastic moduli E and the sectional secondary moments I in Equations (6) and (7) are corrected according to Equations (8) to (11) or Equations (11) and (12), then the natural frequency $f_2'$ of the inner tube 1 and the natural frequency $f_2'$ of the outer tube 2 at their detected temperatures are determined. Further, stresses acting on the inner tube 1 and the outer tube 2 are multiplied by respective correction factors and natural frequencies of respective tubes when the stresses are applied to them.

The natural frequency $f_1''$ of the inner tube 1 and the natural frequency $f_2''$ of the outer tube 2, which have been corrected for the stresses produced, are expressed as follows:

$$f_1'' = K_{16} \cdot f_1' \quad (14)$$

$$f_2'' = K_{17} \cdot f_2' \quad (15)$$

where $K_{16}$ and $K_{17}$ are correcting factors. A coupled frequency f'' can be now determined according to Equation (3) by applying Equations (14) and (15).

A correction factor C for correcting a natural frequency of a tube fixed at both ends in the case the load P is applied in the axial direction thereof is expressed generally as follows:

$$C = \left( K_{18} - K_{19} \frac{K_{20} P}{EI} \right)^{-\frac{1}{2}} \quad (16)$$

where $K_{18}$ to $K_{20}$ are constants.

Accordingly, it is possible to make correction for a frequency difference Δf of the resonant frequencies f'' including the influence of the stresses of respective tubes, which can be calculated by using input temperature signals of respective tubes and Equations (14) and (15) stored in the instrumental-error correcting circuit.

Figure 5:
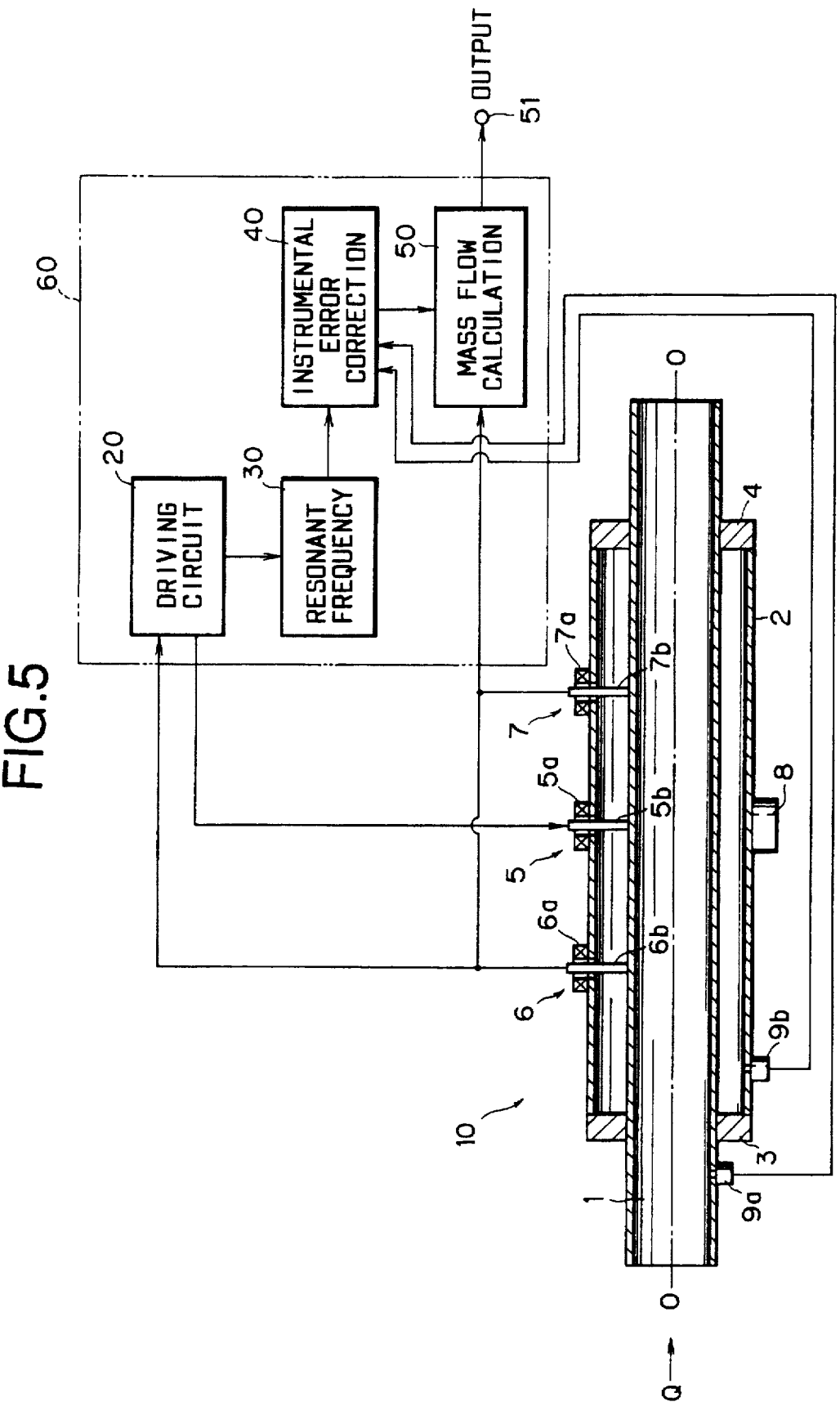
FIG. 5 is a view for explaining a Coriolis flowmeter converter embodying the present invention.

FIG. 5 is illustrative of a configuration of a Coriolis flowmeter embodying the present invention. In FIG. 5, there is shown an inner tube 1, an outer tube 2, ring flanges 3, 4, a vibrator 5, sensors 6, 7, a balance weight 8, temperature sensors 9a, 9b, an oscillating coaxial double-tube body 10, a driving circuit 20, a resonant frequency detecting circuit 30, an instrumental error correcting circuit 40, a mass flow-rate calculating circuit 50, an output terminal 51, a mass-flowmeter converter 60.

The oscillating double-tube body 10 is composed of the inner tube 1, the outer tube 2 and the balance weight 8. The inner tube 1 is a straight tube whose axis is shown by 0—0 and in which fluid to be measured flows. The outer tube 2 having ring flanges 3 and 4 at both ends, by which it is coaxially mounted on the external wall of the inner tube 1. The balance weight 8 is secured to a center portion of the external wall of the outer tube 2. This balance weight 8 is used for making a natural frequency of the outer tube 2 equal to the natural frequency of the inner tube 1.

The weight of the balance weight 8 is adjusted to the natural frequency determined for the outer tube weight including mass of the vibrator 5 for driving the double-tube body 10 and mass of the sensors 6 and 7.

The temperature sensor 9a for sensing a temperature of the inner tube 1 is attached to the external wall of the inner tube and the temperature sensor 9b for sensing a temperature of the outer tube 2 is attached to the external wall of the outer tube 2. Both temperature sensors 9a and 9b are connected to the instrumental error correcting circuit 40 by wiring through a through hole made in the wall of the outer tube 2 or by using a connecting terminal.

The vibrator 5 is composed of, e.g., a coil 5a attached to the outer tube 2 and core 5b coaxially mounted to the inner tube 1. The coil 5a is excited by the driving circuit 20 whereto a signal from either of two sensors 6 and 7 is inputted. The oscillating double-tube body 10 composed of the inner tube 1 and the outer tube 2 is driven at a resonant frequency of a constant amplitude.

The sensors 6 and 7 have the same standard characteristics and disposed at symmetrically opposite positions relative to the vibrator 5 on the double-straight-tube body 10. Each sensor 6, 7 consists, for example, of a coil 6a, 7a and a magnet 6b, 7b, which are coaxially mounted on the outer tube 2 and the inner tube 1 respectively. Both sensors are connected to the mass-flow calculating circuit 50. They are used for detecting phase signals at detecting positions determined from a relative velocity displacement between the inner tube 1 and the outer tube 2. The phase difference signal is produced from two phase signals and a mass flow is determined from said phase different signal.

The mass-flowmeter converter 60 comprises the driving circuit 20, the resonant frequency detecting circuit 30, an instrumental error correcting circuit 40 and the mass flow-rate calculating circuit 50. As described above, the driving circuit 20 drives the vibrator 5 to vibrate the oscillating double-tube body 10 at a resonant frequency having a constant amplitude. This circuit forms a closed-loop type resonantly driving system that detects a signal from either one of paired sensors 6, 7, amplifies the detected signal and drives the vibrator 5. The resonant frequency may widely vary depending upon density and temperature of fluid and the mounting conditions of the flowmeter. Accordingly, the resonant frequency is an essential factor that decides the compensative instrumental error according to the present invention. It is detected by the resonant frequency detecting circuit 30.

The instrumental error correcting circuit 40 is an essential portion featuring the mass-flowmeter converter 60 according to the present invention.

If a measuring tube supported at both ends by supporting means is supposed to be driven with a constant amplitude of vibration, the driving frequency may vary under the influence of temperature, pressure and density of fluid and elastic modulus of measuring tube material. Similarly, the inner tube 1 of the oscillating double-tube body 10 may change its resonant frequency under the influence of temperature, pressure and density of fluid and elastic modulus of its material. Furthermore, the oscillating double-tube body 10 may vary natural frequencies of the inner tube 1 and the outer tube 2 owing to a difference of temperatures of two tubes, a difference of resultant thermal stresses in respective tubes and differences of materials and shapes of the tubes. The amplitude ratio between the inner tube 1 and the outer tube 2 may therefore change even if they are driven at a constant amplitude of vibration.

Thus, the oscillating double-tube body 10 in comparison with the single straight tube presents complicated phenomena of vibration. In a resonant vibration system, the oscillating double-tube body 10 may have a complicated vibration mode defined by physical property and quantity of state of measurable fluid and by materials and shapes of its components, causing a change of the instrumental error of the flowmeter. According to the present invention, factors causing a change of the instrumental error are classified into a change of temperature of the inner tube 1, a temperature difference between the inner tube 1 and the outer tube 2 and a change of resonant frequency of the oscillating double-tube body 10. Namely, instrument errors that are usually determined by performing complex calculations are classified into a first compensative instrumental error value resulted from a change of temperature of the inner tube 1, a second compensative instrumental error value resulted from a temperature difference between the inner tube 1 and the outer tube 2 and a third compensative instrumental error value resulted from a difference of resonant frequencies. A total instrumental error value is determined by adding together these three kinds of instrumental error values and then corrected. The first compensative instrumental error value to be determined for a change of the inner tube temperature is an instrument error which is supposed to be caused by thermal expansion of the inner tube 1 only and is separated from a total instrumental error. This instrumental error is determined in the following manner:

A reference temperature of a reference fluid is first defined, for example, at 0° C. and an instrumental error is calculated in proportion to a difference between a fluid temperature (measured value) and the reference temperature value. The first compensative instrumental error value Ct has the following expressions:

$$Ct = K_1(Tx - Ta) \tag{17}$$

where Ta is reference temperature and $K_1$ is a predetermined constant of proportionality.

The second compensative instrumental error value Cdt caused by a temperature difference At between the inner tube 1 and the outer tube 2 is such that the temperature difference causes thermal stresses acting on the inner tube 1 and outer tube 2 to change respective axial loads, resulting in changing their vibration mode. This causes an instrumental error that is separated from a total instrumental error. The second instrumental error Cdt is determined by using a relation with a variable Δt (the above-mentioned temperature difference Δt) and coefficients Ka, Kb and Kc. Namely, it is expressed as follows:

$$Cdt = Ka\Delta t^2 + Kb\Delta t + Kc \tag{18}$$

The third compensative instrumental error value caused by a resonance frequency difference Δf of the oscillating double-tube body 10 is such that the inner tube 1 with a flow of fluid having a different density may change its natural frequency, thereby a coupled frequency (i.e., resonant frequency) formed by natural frequencies of the inner tube 1 and the outer tube 2 changes, causing an instrumental error to be corrected. An instrumental error caused by a density difference of fluid flowing in the inner tube 1 is defined according to a ratio of the inner-tube oscillation amplitude to the outer-tube oscillation amplitude. However, very complicated vibrational calculation must be conducted to determine the above-mentioned instrumental error. As it is difficult for the proposed converter to include a circuit for performing such complex calculation, the present invention adopts the following means:

A resultant instrumental error concerns a resonant frequency difference Δf. It is also proportional to a measured (fluid) frequency fx as well as a difference between the measured frequency fx and a reference (fluid) frequency ft corrected and standarized on the basis of a spring constant β of the inner tube 1 and a difference between reference temperature Tw. Namely, the instrumental error is defined as an error whose value is inversely proportional to a period Pw of the frequency ft (e.g., at reference temperature 0° C.). The third compensative instrumental error value Cf is therefore calculated according to the following expressions:

$$fx = fx - ft \tag{19}$$
$$= fx\{1/(1 + \beta (Tx - Tw)^{0.5}\}/Pw$$

$$CF = Afx^2 + Bfx + C \tag{20}$$

where A, B and C are coefficients.

Accordingly, a total instrumental error ΔE consists of the first compensative instrumental error value Ct (for compensating an error caused by a temperature of the inner tube), the second compensative instrumental error value Cdt (for compensating an error caused by a temperature difference At between the inner tube 1 and the outer tube 2) and the third compensative instrumental error Cf (for compensating errors caused by fluid density difference Δρ and by a resonant frequency difference Δf). The instrumental error correcting circuit 40 outputs the total instrumental error ΔE determined according to the following expression:

$$\Delta E = Ct + Cdt + Cf \tag{21}$$

The mass-flow calculating circuit 50 obtains a phase difference signal ΔT proportional to a Coriolis force outputted from the sensors 6 and 7 and determines a mass flow Qa proportional to the phase difference signal ΔT. The determined mass flow Qa is a value corrected for the instrumental error ΔE determined by Equation (21). Namely, the mass flow Qa has the following expression where ka is a proportionality constant of the phase difference signal Δt for calculating the mass flow.

$$Qa = Ka(1 + \Delta E)\Delta T \tag{22}$$
$$= Ka(1 + Ct + Cdt + Cf)\Delta T$$

A signal of mass flow Qa corrected for the above-mentioned instrumental error ΔE is finally outputted through the output terminal 51.

Although coaxial double-tube type Coriolis flowmeters were described hereto with reference to Figs., there is still a straight-tube type conduit Coriolis flowmeter which has a single flow tube provided with a counter-balance supported in parallel to the flow tube. This type Coriolis flowmeter involves the same problems as the double-tube type Coriolis flowmeter.

The present invention is also directed to enabling the parallel-tube type Coriolis flowmeter to make the same kinds of correction of instrumental errors as described for the coaxial double-tube type Coriolis flowmeter.

Figure 6:
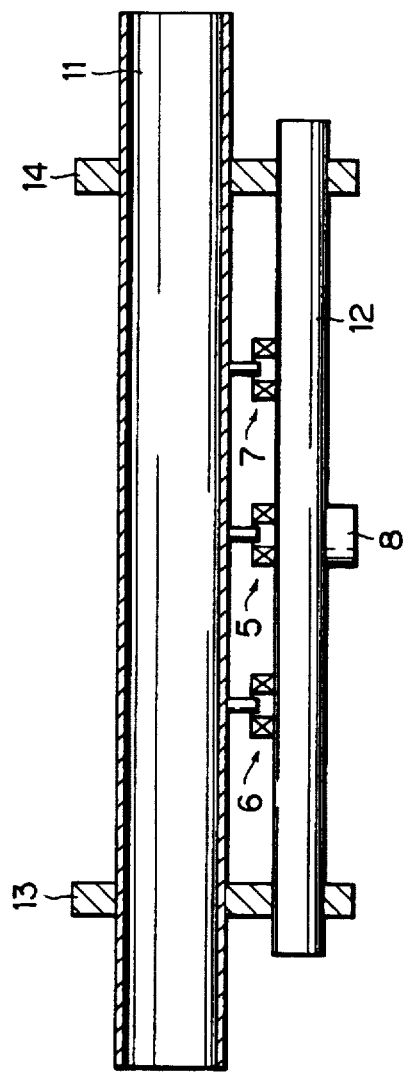
FIG. 6 is a view for explaining another embodiment of the present invention.

FIG. 6 is a sectional view of an embodiment of the present invention. In FIG. 6, numeral 11 designates a flow tube, numeral 12 designates a counter-balance and numerals 13 and 14 designate supporting plates. Other components similar in function to those shown in FIG. 1 are given the same numerals.

The Coriolis flowmeter shown in FIG. 6 has a straight flow tube 11 wherein fluid to be measured flows and a counter-balance 12 supported, parallel to the flow tube, on supporting plates 13 and 14. The counter- balance is provided with a balance weight 8 attached thereto for making a natural frequency of the counter-balance 12 equal to a natural frequency of the flow tube 11. The flow tube 11 and the counter-balance 12 have a vibrator 5 at their center portions and sensors 6 and 7 arranged symmetrically at the same distance from the vibrator 5. Furthermore, the flow tube 11 and the counter-balance 12 are resonantly driven by the vibrator 5, both being supported on the supporting plates 13 and 14. The counter-balance may be a rod, tube or plate.

In the Coriolis flowmeter shown in FIG. 6, fluid flows in the flow tube 11 only and the counter-balance 12 is supported apart from and parallel to the flow tube 11 and has a constant weight 8. Therefore, the effects of density and temperature of fluid and temperature difference between the flow tube 11 and the counter-balance 12 are similar to those described for the double straight tube type Coriolis flowmeters of FIGS. 1, 4, 5. Accordingly, the same instrumental-error correcting means as described the above can be applied to the single flow-tube type flowmeter of FIG. 6.

As apparent from the foregoing description, according to the present invention, it is possible to provide following advantageous effects:

An instrumental error caused by a change in density of measurable fluid can be corrected by only detecting a resonant frequency with no need for detecting frequency ratio between the inner tube and the outer tube.

The same effect can be obtained by only storing a relation between resonant frequencies and instrumental errors, i.e., enabling conducting the instrumental error correction at a lower cost.

A change of instrumental error, which is caused by a temperature change of inner tube even in the case that the inner tube differs from the outer tube in material and shape can be corrected by using a simple correcting circuit.

When the inner tube is heated by fluid flowing therein and changes its temperature, different axial stresses are produced in the inner tube and the outer tube by the effect of difference of their temperatures but a resulted instrumental error can be easily corrected.

According to the present invention, it is possible to provide a converter which enables a coaxial double-straight-tube type Coriolis flowmeter to accurately determine a mass flow-rate of fluid by automatically correcting a total instrumental error caused by a change of natural frequencies of inner and outer tubes due to a change of fluid temperature and density in such a manner that a first compensative instrumental error value Ct caused by a simple thermal expansion of the inner tube, a second compensative instrumental error value Cdt caused by a temperature difference between the inner tube and the outer tube and a third compensative instrumental error value Cf caused by a difference $\Delta f$ between a measured resonant frequency (for measured fluid) and a corrected and standarized frequency (for reference fluid) are separately calculated and added together to obtain the total instrumental error for which the measured mass flow is corrected. This converter is simple and inexpensive and eliminates the necessity of conducting complex calculations to correct measurement results.

According to the present invention, it is possible to provide a small and high-accuracy straight-tube type Coriolis flowmeter which is reliable to measure mass flow without being affected by fluid density and temperature conditions like the coaxial double straight tube type Coriolis flowmeters according to the present invention.

We claim:

1. An error correcting Coriolis flowmeter, comprising:

a double-wall conduit composed of an inner tube in which fluid to be measured flows and an outer tube coaxially mounted on the inner tube and secured at both ends thereto, said outer tube having a balance weight attached thereto for equalizing a natural frequency of vibration of the outer tube with a natural frequency of vibration of the inner tube;

driving means for driving the double-wall conduit at a resonant frequency;

a pair of sensors for detecting a change in phase proportional to a Coriolis force acting on the double-wall conduit;

a mass flow-rate calculator for determining a mass flow rate according to an output of the sensors;

storage means for storing data on a first relation relating a particular resonant frequency of said inner tube as a function of density of a corresponding fluid therein, and data on a second relation relating instrument error as a function of density of the corresponding fluid; and instrument error correcting means for first determining a density of a measured fluid by comparing a resonant frequency of said inner tube while said measured fluid flows therethrough with the first relation data stored in the storage means, and then obtaining a value representative of an instrument error by comparing the determined density with the second relation data stored in the storage means, and correcting the instrument error using the obtained value.

2. An error correcting Coriolis flowmeter comprising:

a double-wall conduit composed of an inner tube in which fluid to be measured flows and an outer tube coaxially mounted on the inner tube and secured at both ends thereto, said outer tube having a balance weight attached thereto for equalizing a natural frequency of vibration of the outer tube with a natural frequency of vibration of the inner tube;

driving means for driving the double-wall conduit at a resonant frequency;

a pair of sensors for detecting a change in phase proportional to a Coriolis force acting on the double-wall conduit; and a mass flow-rate calculator for determining a mass flow rate according to an output of the sensors;

storage means for storing data on a relation between frequency differences and instrumental error shift differences relative to a previously known standard resonant frequency based upon data relating instrumental error to resonant frequency for different reference fluids; and instrument error correcting means for correcting an instrumental error according to a difference between the standard resonant frequency stored in the storage means and a frequency measured while the fluid to be measured is flowing in the Coriolis flowmeter.

3. A coriolis flowmeter as defined in any one of claims 1 or 2, wherein the inner tube and the outer tube have respective temperature sensors capable of sensing changes of temperatures of the respective tubes from a standard temperature to working temperatures with fluid flowing in the flowmeter and instrumental-error correcting means is provided for correcting an instrumental error for a difference between a standard resonant frequency at a standard temperature and a resonant frequency at a temperature determined when working with a flow of the fluid, said measured resonant frequency varying according to elastic moduli of materials and shapes of the inner tube and the outer tube.

4. A coriolis flowmeter as defined in any one of claims 1 or 2, wherein the inner tube and the outer tube have respective temperature sensors capable of sensing changes of temperatures of the respective tubes and determining a difference between temperatures of the two tubes, which differential temperature causes a differential change of axial loads of the inner tube and the outer tube, and an instrumental-error correcting means is provided for correcting a change of an instrumental error to be caused by a difference of a resonance frequency from a standard resonance frequency, said difference being resulted from a difference between temperatures of the inner tube and the outer tube.

5. An error correcting Coriolis flowmeter, comprising:

a convertor which comprises a double conduit composed of an inner tube in which fluid to be measured flows and an outer tube coaxially mounted on the inner tube and secured at both ends thereto, said outer tube having a balance weight attached thereto for making a natural frequency of vibration of the outer tube equal to a natural frequency of vibration of the inner tube;

driving means for driving the double conduit at a resonant frequency having a constant amplitude;

a pair of sensors for detecting a phase difference proportional to a Coriolis force acting on the double conduit, which converter determines a mass flow-rate according to outputs of the paired sensors;

temperature detecting means for detecting a temperature of the inner tube, and temperature detecting means for detecting a temperature of the outer tube;

temperature correcting means for compensating an instrumental error according to a change of temperature of the inner tube;

temperature difference correcting means for compensating an instrumental error according to a difference between a temperature of the inner tube and a temperature of the outer tube;

resonant frequency correcting means for compensating an instrumental error caused by a difference of a resonant frequency of the oscillating double conduit measured with a flow of fluid passing therethrough, as compared with a resonant frequency of the oscillating double conduit measured with a flow of corrected and standardized fluid passing therethrough; and an instrumental error correcting means for correcting an instrumental error according to a sum of respective compensative instrumental-error values determined by the temperature correcting means, the temperature difference correcting means and the resonant frequency correcting means.

6. A coriolis flowmeter as defined in any one of claims 1 or 2 or 5, wherein the oscillating double conduit comprises a flow tube in which fluid to be measured flows and a linear tube type counter balance secured at both ends to the flow tube as being parallel to the flow tube axis and said linear tube type counter balance is provided with a balance weight for equalizing a natural frequency of vibration of the counterbalance with a natural frequency of vibration of the flow tube.

* * * * *